United States Patent [19]

McDaniel et al.

[11] 4,211,863

[45] Jul. 8, 1980

[54] POLYMER SLURRY CATALYST RESIDUE DEACTIVATION

[75] Inventors: Max P. McDaniel; John D. Hottovy; Melvin B. Welch, all of Bartlesville, Okla.

[73] Assignee: Phillips Petroleum Company, Bartlesville, Okla.

[21] Appl. No.: 4,123

[22] Filed: Jan. 17, 1979

[51] Int. Cl.² ............................................. C08F 6/02
[52] U.S. Cl. ............................. 528/483; 526/124; 526/348.2; 528/499
[58] Field of Search .......................................... 523/483

[56] References Cited

U.S. PATENT DOCUMENTS

| | | | |
|---|---|---|---|
| 2,910,461 | 10/1959 | Nowlin et al. | 260/94.9 |
| 3,057,696 | 10/1962 | McLeod | 23/260 |
| 3,176,000 | 3/1965 | Scoggin | 260/93.7 |
| 3,197,454 | 7/1965 | Plaster | 260/93.7 |
| 3,269,997 | 8/1966 | Lyons et al. | 260/94.9 |
| 3,279,087 | 10/1966 | Hearne et al. | 34/12 |
| 3,285,899 | 11/1966 | Houser et al. | 260/93.7 |
| 3,428,619 | 2/1969 | Hawkins et al. | 260/93.7 |

*Primary Examiner*—Stanford M. Levin

[57] ABSTRACT

Catalyst residues of a transition metal compound and an organometalliccompound contained in a polymer slurry are deactivated by contact with anhydrous carbon dioxide. Preferably the contacting is carried out in a transfer line connecting the reaction zone with a zone of sufficiently lower pressure that flashing of diluent occurs in the transfer line to assure mixing of the carbon dioxide and the catalyst residues.

7 Claims, No Drawings

POLYMER SLURRY CATALYST RESIDUE DEACTIVATION

BACKGROUND OF THE INVENTION

This invention relates to catalyst residue deactivation. In one of its aspects this invention relates to polymerization reactions. In another of its aspects this invention relates to the treatment of polymer slurries. And yet another of its aspects this invention relates to the production of polymers of olefins by the particle form polymerization process.

It is well known that many substances such as water, Ionol, and propylene oxide can be used to deactivate catalyst residues in polymer slurries. It has also been taught in U.S. Pat. No. 3,269,997 that carbon dioxide can be used as a polymer-decolorizing treating agent in the presence of a colored organometal complex catalyst in the preparation of polymeric compositions. The method has now been found which, surprisingly, shows that carbon dioxide can be used as a deactivation agent that is both efficient and produces polymer having excellent characteristics when treating polymers produced with catalysts of a transition metal compound and an organometallic compound.

It is therefore an object of this invention to provide a method for deactivating catalyst residues in polymer slurries. It is another object of this invention to provide a method for deactivating catalyst residues of a transition metal compound and an organometallic compound contained in a polymer slurry.

Other aspects, objects and the various advantages of this invention will become apparent upon reading the specification and the appended claims.

STATEMENT OF THE INVENTION

According to this invention catalyst residues in which a transition metal compound and an organometallic compound are contained in a polymer slurried in a diluent are deactivated by contact with anydrous carbon dioxide.

The method of the invention is particularly useful with a polymer slurry which can be made in a particle form 1-olefin polymerization process in which the slurry is made of solid particles of polyolefin, hydrocarbon diluent, monomer(s) and hydrogen, if used. The polymer slurry is contacted with anhydrous carbon dioxide, preferably immediately downstream of the reactor and, most preferably, in a transfer line leading to a zone of lower pressure. This contacting takes advantage of the mixing action caused by the turbulence that is created as the diluent begins to flash as the pressure is decreased.

The particle form polymerization process can be conducted batchwise in a stirred reactor or in a continuous manner employing a loop reactor. A continuous process for polymerizing ethylene in a particle form process employing a support chromium oxide catalyst and a loop reactor is described in U.S. Pat. No. 3,279,087. U.S. Pat. No. 3,285,899 describes polymerizing propylene in a loop reactor employing a catalyst system comprising an organometal compound and a compound of Periodic Groups IV-B, V-B, or VIII. Specifically, the catalyst system consists of $TiCl_3$ and diethylaluminum chloride.

In the present invention, the carbon dioxide catalyst deactivation agent can be employed with a variety of transition metal compound/organometal compound catalyst systems, particularly those systems in which a titanium and/or vanadium compound constitutes the catalyst and organoaluminum compound(s) constitutes the cocatalyst. For example, in co-pending application 907,471 filed May 19, 1978, a catalyst system is disclosed which consists of a catalyst composition prepared from a titanium alkoxide and a vanadium oxytrihalide which is subsequently treated with a titanium tetrahalide and a cocatalyst comprising organoaluminum compound(s), e.g., triethylaluminum.

A composition prepared by intensively milling together $TiCl_4$ and $MgCl_2$ to form a composite that is further milled with an $Mg(OR)_2$ compound can be used with a cocatalyst of organoaluminum compound, e.g., triethylaluminum in the preparation of polymers of 1-olefins. These catalysts can be effectively deactivated by the method of this invention.

A catalyst system as mentioned above can be employed in the polymerization of ethylene alone or admixed with a minor amount, e.g., less than about 20 mole percent of at least one higher aliphatic 1-olefin containing from 3 to about 10 carbon atoms. If propylene or a branched 1-olefin constitutes the major portion of the monomer(s) to be polymerized, it is generally preferable to include a Lewis base, preferably an alkyl ester of an aromatic carboxylic acid, e.g., ethyl benzoate, ethyl anisate, with the cocatalyst to improve stereospecificity of the catalyst system to the formation of crystalline polymer.

All of the recovered polymers are normally solid resins which can be converted into films, containers, fibers, and the like.

EXAMPLE I

A composition was prepared by ball milling 84.1 g of dry magnesium chloride with 15.9 g of titanium tetrachloride for 20 hours at ambient conditions. The calculated amount of titanium in the composition was 4.0 wt. %. A sample of the milled composite weighing 4.55 g was thoroughly mixed with 17.2 g of dry polyethylene powder, sieved through a 50 mesh screen (U.S. Sieve Series), to produce a catalyst composition.

A series of ethylene/1-hexene copolymers was prepared in a continuous particle form process by contact of the catalyst with the monomers employing a loop reactor having a volume of 98.4 liters, isobutane as the diluent, triethylaluminum as the cocatalyst, hydrogen to regulate the molecular weight of the product and a residence time of two hours. The reactor temperature was 103° C. and the reactor pressure was 4 MPa (580 psi). At steady state conditions, the isobutane feed rate was 30 l/hr, the ethylene feed rate was about 18.5 lbs/hr (8.4 kg/hr), the 1-hexene feed rate was about 0.75 lbs/hr (0.34 kg/hr). A triethylaluminum solution (0.5 wt. % in hexane) was added at the rate of 100 ml/hr to maintain a concentration of 20 ppm in the reactor based on the isobutane contents, the catalyst feed rate varied from about 0.7-1 g/hr (diluted catalyst) and the solids content in the reactor was calculated to be 30 wt. %. Copolymer was recovered at the rate of about 17 lbs/hr (7.7 kg/hr).

The charge rates of monomers and catalysts employed, various ratios used, calculated catalyst productivity values, and several determined properties of the recovered copolymers are presented in Table I.

The results given in Table I indicate that copolymers of ethylene and 1-hexene are produced in good yields from the catalyst-cocatalyst system employed.

TABLE I

ETHYLENE/1-HEXENE COPOLYMER PRODUCTION

| Run No. | $C_2^=$ In Reactor mole % | $H_2/C_2^=$ Mole Ratio | Catalyst[a] Productivity kg/g | Fluff Bulk Density g/cc | Fluff Bulk Density lbs/ft³ | Pelleted Copolymer Properties $M_I$[c] | Pelleted Copolymer Properties Density,g/ml[d] | Catalyst Residue[b] ppm Ti | Catalyst Residue[b] ppm Mg | Catalyst Residue[b] ppm Al | Catalyst Residue[b] ppm Cl |
|---|---|---|---|---|---|---|---|---|---|---|---|
| 1 | 6.7 | 0.150 | 29.0 | 0.44 | 27 | 16.6 | 0.9500 | 2 | 7.4 | 16 | 24 |
| 2 | 10.6 | 0.111 | 43.0 | 0.44 | 27 | 13.4 | 0.9582 | 2 | 5.0 | 17 | 16 |
| 3 | 6.8 | 0.167 | 28.6 | 0.44 | 27 | 18.5 | 0.9574 | 2 | 7.5 | 15 | 24 |
| 4 | 6.5 | 0.161 | 27.4 | 0.45 | 28 | 18.6 | 0.9570 | 2 | 7.8 | 15 | 29 |

[a] Calculated productivity as kilograms copolymer per gram catalyst (undiluted basis) per hour.
[b] Determined values calculated as the elements from catalyst residues remaining in recovered, dried polymer
[c] Determined in accordance with ASTM D1238-65T, condition E.
[d] Determined in accordance with ASTM D1505-68

EXAMPLE II

The polymer in each run of Example 1 was recovered by discharging reactor effluent into a ¾ inch (1.90 cm) ID stainless steel pipe about 15 feet long communicating with a flash chamber operating at pressures ranging from about atmospheric pressure to about 3 psig. (0-21 kPa gage). The product from the flash chamber was dried, stabilized with 0.02 wt. % 2,6-di-t-butyl-4-methylphenol (Ionol) and 0.03 wt. % dilaurylthiodipropionate and converted into pellets by extrusion as conventionally practiced in the art.

The reactor effluent from each run was contacted with a catalyst deactivating agent just downstream from the product takeoff valve, located near the reactor, which dispensed reactor effluent into the line leading to the flash chamber.

Propylene oxide was injected into the reactor effluent at a rate of 35 ml per hour (28.8 g/hr) in Run 1. The weight ratio of copolymer:propylene oxide/hr is calculated to be about 268:1. Dry carbon dioxide was injected into the reactor effluent in Run 2 at the rate of 1.6 standard cubic feet per hour which is calculated to be equivalent to 89 g/hr. The copolymer:$CO_2$/hr weight ratio is calculated to be 87:1.

Steam was injected into the reactor effluent in Run 3 at the water equivalent rate of 60 g/hr. The copolymer:$H_2O$/hr weight ratio is calculated to be 128:1.

Ionol as a 0.5 wt. % solution in dry n-hexane was injected into the reactor effluent in Run 4 at the rate of 650 ml/hr or the equivalent of 3.25 g/hr. The copolymer:Ionol/hr weight ratio is calculated to be 2370:1.

The recovered pelleted copolymers or molded specimens thereof were then tested for possible corrosion of metal processing equipment, color and odor.

Corrosivity was determined on samples prepared by compression molding a layer of polymer onto 1¼" (3.1 cm) diameter polished carbon steel coupons at 500° F. (260° C.) for 15 minutes. The samples were cooled to room temperature, the polymer stripped from the coupons and the coupons were aged at room temperature at 100% relative humidity for 24 hours. The treated samples were removed, dried and visually inspected for evidence of corrosion.

Molded samples of each polymer were checked for color development by means of a Hunter Color Difference Meter to determine the yellowness index values by direct read out. Yellowness is defined as the deviation in chroma from whiteness or water-whiteness in the dominant wavelength range from 570 to 580 nanometers (nm). The smaller the b value the less the color. Use ASTM-D-1925-70 as a reference.

The odor of each pelleted copolymer was determined by filling a pint (473 ml) jar about ¼ full with powdered pellet material, corking it for about 15 minutes, and then allowing each member of a 10 member panel to smell the contents. The odor of each sample was arbitrarily assigned a value of 1 for the least smell and 4 for the most smell by each member of the panel. The numbers reported in Table II are the average. The test results are given in Table II.

TABLE II

COLOR, CORROSIVITY AND ODOR OF DEACTIVATED COPOLYMERS

| Run No. | Deactivation Agent | Hunter b Color | Corrosivity[a] | Odor |
|---|---|---|---|---|
| 1 | propylene oxide | 1.4 | s | 3.2 |
| 2 | carbon dioxide | 1.2 | s | 2.7 |
| 3 | water | 5.9 | c | 1.0 |
| 4 | Ionol | 1.0 | c | 3.1 |

[a] s = small amount of corrosion
c = corrosion present

Inspection of the results indicates that carbon dioxide treated polymer, Run 2, gives the best balance of properties since polymer treated with it has good color, little odor and exhibits little corrosivity. Propylene oxide, Run 2, is almost as effective as a treating agent as carbon dioxide but its use presents separation problems from the isobutane and ethylene for recycling purposes. Water treated polymer, Run 3, has the least odor but the worst color and corrositivity. The Ionol treated polymer, Run 4, has the best color but has more odor and corrositivity than the carbon dioxide treated polymer and its use also presents separation problems from the isobutane and ethylene.

We claim:

1. A method for deactivating catalyst residues of a transition metal compound and an organometallic compound contained in a polymer product slurry said method comprising (1) contacting said residue-containing slurry with anhydrous $CO_2$ in a transfer line downstream of the outlet of a polymerization reaction zone and (2) sufficiently reducing pressure on said polymer slurry to flash at least a portion of the liquid in said slurry thereby producing a zone of turbulence in conjunction with said contacting to cause an action of mixing said polymer slurry and anhydrous $CO_2$.

2. A method of claim 1 wherein said slurry comprises solid polyolefin particles, hydrocarbon diluent and reactant monomer.

3. A method of claim 2 wherein said slurry also comprises hydrogen.

4. A method of claim 2 wherein said polymer slurry is produced in a particle form 1-olefin polymerization process.

5. A method of claim 1 wherein said catalyst residues are derived from a catalyst system in which said transition metal compound is chosen from compounds of titanium and vanadium, and said organometallic compound is an organoaluminum.

6. A method of claim 5 wherein said metal compounds comprise a titanium alkoxide, a vanadium oxytrihalide, and a titanium tetrahalide, and said organoaluminum compound is triethylaluminum.

7. A method of claim 5 wherein said transition metal compound is titanium tetrachloride milled with magnesium dichloride to form a composite and further milled with a magnesium alkoxide.

* * * * *